United States Patent [19]

Janutta

[11] Patent Number: 4,624,081
[45] Date of Patent: Nov. 25, 1986

[54] TURN-AROUND MECHANISM FOR WORKPIECES IN GRINDING MACHINES

[75] Inventor: Reinhard Janutta, Geesthacht, Fed. Rep. of Germany

[73] Assignee: Hauni-Werke Körber & Co. KG, Hamburg, Fed. Rep. of Germany

[21] Appl. No.: 693,753

[22] Filed: Jan. 23, 1985

[30] Foreign Application Priority Data

Feb. 4, 1984 [DE] Fed. Rep. of Germany ....... 3403888

[51] Int. Cl.$^4$ .............................................. B24B 3/52
[52] U.S. Cl. ................................ 51/98.5; 51/216 ND; 51/125.5
[58] Field of Search ................ 51/215 R, 98.5, 125.5, 51/218, 218 A, 217 R, 217 A, 216 ND

[56] References Cited

U.S. PATENT DOCUMENTS 3,018,591 6/1962 Wrobbel ........................... 51/217 R
3,027,693 4/1962 Armitage .......................... 51/217 R

FOREIGN PATENT DOCUMENTS

631413 11/1961 Canada .............................. 51/125.5

Primary Examiner—Frederick R. Schmidt
Assistant Examiner—Maurina Rachuba
Attorney, Agent, or Firm—Peter K. Kontler

[57] ABSTRACT

A grinding machine for workpieces having pairs of surfaces which are disposed opposite each other and each of which must be treated by the grinding wheel has one or two inverting heads each of which can removably receive one end portion of a workpiece so that the two surfaces of the workpiece remain exposed. The inverting heads can be turned in synchronism through 180 degrees between first positions in which the first surface of the workpiece can be treated by the grinding wheel and second positions in which the grinding wheel can treat the second surface of the workpiece. The inverting heads are further movable to intermediate positions in which a finished workpiece can be replaced with a fresh workpiece. Several workpieces can be accumulated into a stack which is inserted into a cassette and the latter confines the stack during introduction into, movement in and evacuation of stacked workpieces from the grinding machine. The inverting heads are turned by pairs of arms which are articulately connected to the respective inverting members and to a work support which is movably installed in the frame of the grinding machine. The workpiece or workpieces rest on the support during treatment of their surfaces by the grinding wheel.

16 Claims, 5 Drawing Figures

TURN-AROUND MECHANISM FOR WORKPIECES IN GRINDING MACHINES

BACKGROUND OF THE INVENTION

The present invention relates to machine tools in general, especially to grinding machines, and more particularly to improvements in machine tools for the treatment of special types of workpieces. Still more particularly, the invention relates to improvements in machine tools for removal of material from consecutive workpieces of the type having pairs of surfaces to be treated and wherein such surfaces are disposed opposite each other. Typical examples of such workpieces are twin-bladed knives of the type used in hedge cutting or trimming apparatus. The cutting edges of such knives are disposed diametrically opposite each other, i.e., it is necessary to turn the knife through 180 degrees if the grinding or another treatment of one cutting edge by a tool is to be followed by the grinding or another treatment of the other cutting edge by the same tool.

As a rule, twin-bladed knives for use in hedge trimming or like apparatus are assembled into a package or stack and the stack is confined in a receptacle, known as cassette, which affords convenient access to both cutting edges of each knife of the confined stack. Consequently, when the cassette is inserted into a grinding machine or another machine tool (e.g., a lapping machine), the grinding wheel or another suitable material removing tool can treat one cutting edge of the entire stack of knives before the cassette is inverted so as to place the other cutting edge of each knife in the stack into the range of the material removing tool. As a rule, the inverting operation is carried out by hand and must be preceded by detachment of the cassette from the work holder and followed by reattachment of the inverted cassette to the work holder. The treatment of the other cutting edge of each of the knives in the cassette is followed by detachment of the cassette from the work holder and manual removal of the cassette from the machine tool so as to provide room for manual insertion of the next cassette. Such mode of manipulating cassettes with stacked workpieces, each of which has two surfaces that require treatment by a material removing tool, is a tedious, time-consuming and ineconomical procedure which does not allow for full-capacity operation of a modern machine tool, such as a grinding machine.

OBJECTS AND SUMMARY OF THE INVENTION

An object of the invention is to provide an automated or at least partly automated machine tool which can treat discrete workpieces or composite workpieces (of the type having two surfaces which require treatment) in a time-saving and economical manner.

Another object of the invention is to provide a relatively simple and compact mechanism which can manipulate workpieces of the above outlined character in a grinding machine or an analogous machine tool.

A further object of the invention is to provide a work inverting mechanism which can manipulate cassettes for stacked workpieces of the above outlined character.

An additional object of the invention is to provide a machine tool which embodies the improved work inverting mechanism and wherein discrete workpieces or cassettes for stacked workpieces need not be manipulated by hand prior or subsequent to and/or during actual treatment of their plural surfaces.

Still another object of the invention is to provide a novel and improved method of manipulating stacks of twin-bladed knives or analogous workpieces in grinding machines or analogous machine tools.

An additional object of the invention is to provide a grinding machine which can complete the sharpening of stacks of twin-bladed knives or analogous workpieces within a minute fraction of the time which is required for such operations in conventional grinding machines.

The invention resides in the provision of a machine for removing material from composite or discrete workpieces of the type having pairs of surfaces (e.g., surfaces adjacent to cutting edges) to be treated and wherein such surfaces are disposed opposite each other, especially in the provision of a machine for grinding successive stacks of twin-bladed knives for use in hedge trimming apparatus and the like. The machine comprises a rotary material removing tool (such as a grinding wheel), a support having a work supporting face, and a mechanism for inverting consecutive workpieces so that the treatment of one surface of the workpiece resting on the support can be followed by the treatment of the other surface of such workpiece. The mechanism comprises a turn-around device including at least one inverting member having means for engaging consecutive workpieces outside of their surfaces and drive means for moving the one inverting member between a first position in which one surface of the engaged workpiece is in the range of the material removing tool and a second position in which the other surface of the engaged workpiece is in the range of the material removing tool. The drive means defines for the movement of the one inverting member a path wherein the one inverting member is remote from the work supporting face and is caused to turn (preferably through 180 degrees) about a predetermined axis which is at least substantially parallel to the work supporting face. The drive means includes link means which defines the aforementioned path. The engaging means is preferably designed to hold workpieces in cantilever fashion and the drive means can comprise two arms, first pivot means articulately connecting the arms to the one inverting member for angular movement about discrete first and second axes, second pivot means articulately connecting the arms to the support for angular movement about discrete third and fourth axes which are parallel to the first and second axes, and means (e.g., one or more fluid-operated motors) for pivoting the arms about the respective axes. The predetermined axis is parallel to the first, second, third and fourth axes, and the workpiece which is held by the engaging means preferably rests (first with the other and upon inversion with the one surface) on the face of the support in the first and second positions of the one inverting member.

The engaging means can comprise a socket which is provided in the one inverting member and a first guide element (e.g., a straight elongated rail) in the socket. The machine can further comprise a receptacle (such as the aforediscussed cassette) for stacks of workpieces, and the receptacle then comprises a second guide element which is complementary to the first guide element and is reciprocable along the latter into and out of the socket. The second guide element is preferably reciprocable in parallelism with the predetermined axis.

The turn-around device can comprise two spaced-apart inverting members whose engaging means serve to grip and hold two spaced-apart portions of a workpiece or of a receptacle for a stack of workpieces so that the surfaces of the engaged workpiece or the stack of workpieces are accessible to the material removing tool. The drive means then comprises means for moving the other inverting member in synchronism with the one inverting member. Such machine preferably further comprises means for coupling the two inverting members to each other, and the coupling means can include the entraining means (e.g., the aforementioned first guide element) of one of the inverting members. The synchronizing means of the drive means can comprise two shafts which define the third and fourth axes, and the arms for each of the two inverting members are then non-rotatably mounted on the corresponding shafts.

The one inverting member is preferably movable along its path to a third position in which an exposed side of the one inverting member contacts the work supporting face or is closely adjacent thereto. The workpiece which is held by the entraining means of the one inverting member is separable from the latter when such inverting member assumes its third position which is preferably located between the first and second positions, i.e., the one inverting member assumes the third position on its way from the first to the second position or vice versa. The arrangement is preferably such that a workpiece which is properly held by the engaging means of the one and/or the other inverting member occupies one and the same portion of the work supporting face in the first as well as in the second position of the one inverting member.

The receptacle for stacks of workpieces can be provided with rotary follower means and the first guide element of the entraining means of the one inverting member can constitute a rail one side of which is flush with the work supporting face in the third position of the one inverting member to guide the follower means during introduction of a portion of the receptacle into the socket of the one inverting member, i.e., the follower means can travel along the work supporting face and along the rail in the third position of the one inverting member.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
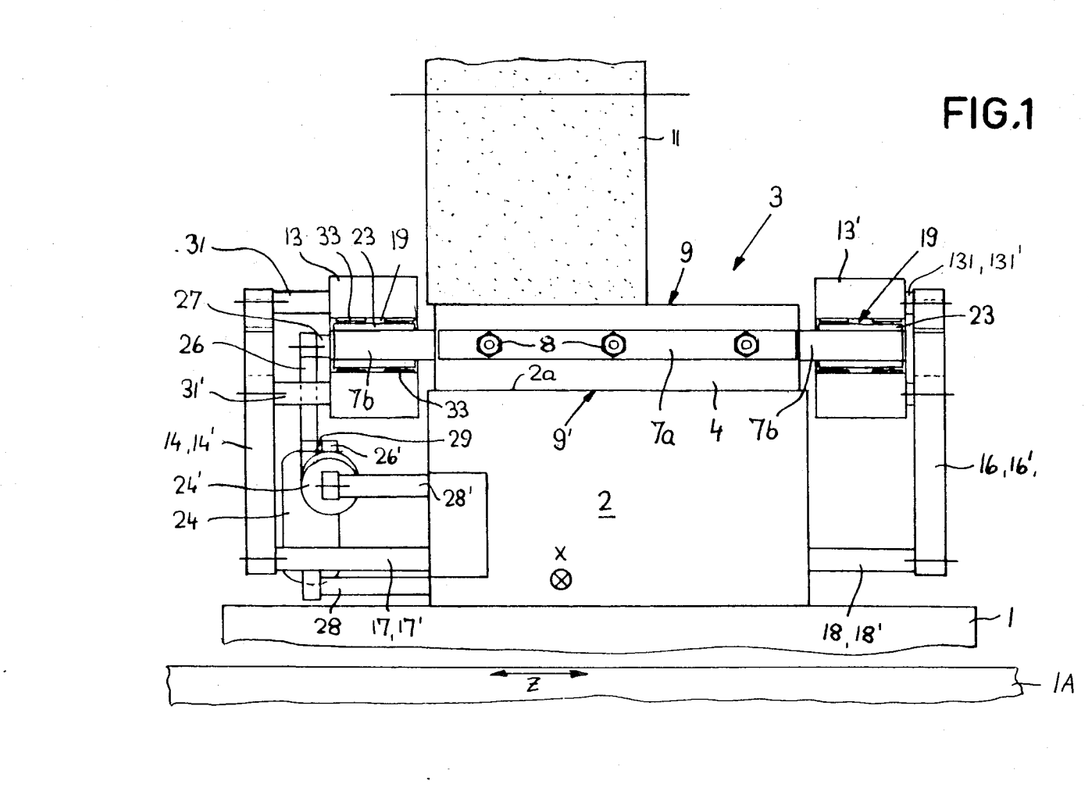
FIG. 1 is a fragmentary front elevational view of a grinding machine which embodies the invention and wherein the turn-around device comprises two inverting members for a receptacle carrying a composite workpiece consisting of a stack of twin-bladed knives, the inverting members being shown in their first positions.
Figure 2:
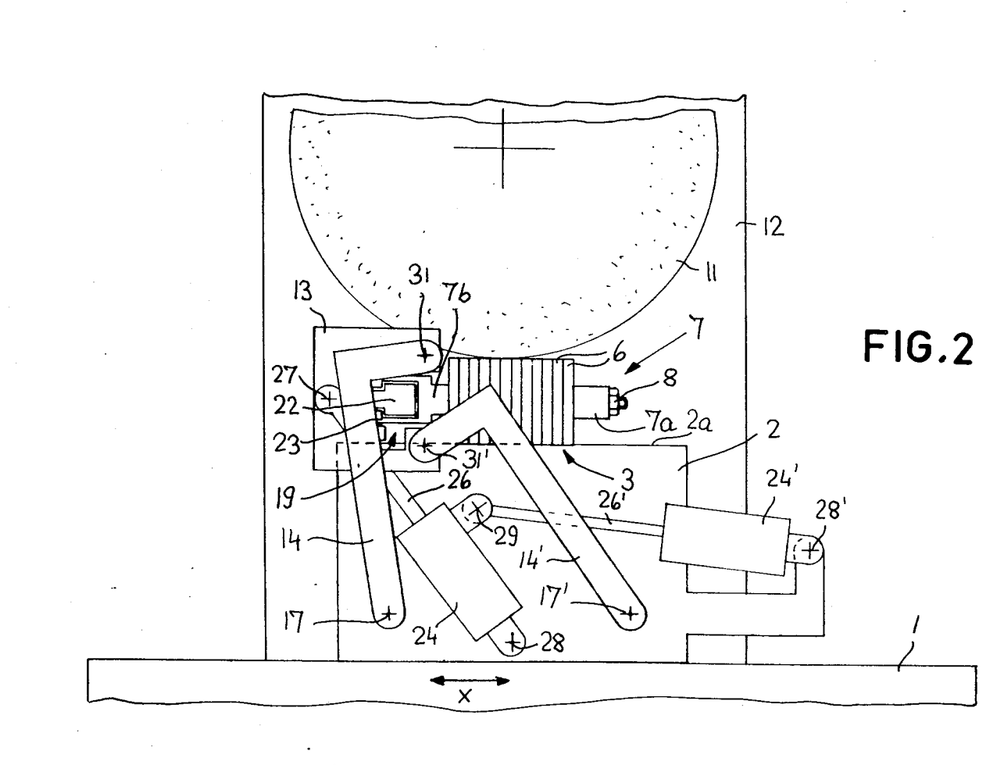
FIG. 2 is a fragmentary side elevational view of the grinding machine as seen from the left-hand side of FIG. 1.

Referring first to FIGS. 1 and 2, there is shown a portion of a grinding machine which comprises a platform 1A reciprocable in directions indicated by the double-headed arrow Z and carrying a table 1 which is reciprocable thereon in directions indicated by the double-headed arrow X. The table 1 includes or is separably or permanently connected with a support 2 having a flat horizontal work-supporting top face 2a. The support 2 can constitute a conventional magnetic work retaining and clamping plate which can carry and attract a workpiece 3 in two different positions in each of which one of two surfaces 9, 9' of the workpiece on the top face 2a is accessible to the working surface of a material removing tool here shown as a single grinding wheel 11.

The illustrated workpiece 3 comprises a package or stack 4 of overlapping discrete workpieces 6 in the form of twin-bladed knives 6 of the type used in hedge cutting or trimming shears or analogous apparatus. Each knife 6 has two surfaces 9 and 9' which are located opposite each other and extend longitudinally of the respective knife. The stack 4 of knives 6 is partially confined in a receptacle or cassette 7 in such a way that the surfaces 9 and 9' of all knives 6 are accessible to the grinding wheel 11. The knives 6 of the stack 4 lie flat against each other and such stack must be inverted once during treatment so as to allow for joint grinding of all surfaces 9 prior to joint grinding of all surfaces 9' or vice versa.

The receptacle or cassette 7 comprises elongated clamping elements 7a and 7b which are adjacent to opposite sides of the stack 4 and are separably secured to each other by screws 8 and/or other suitable fasteners. The grinding wheel 11 is mounted on a spindle (not specifically shown) which is rotatable in a carriage; the latter is reciprocable up and down along an upright column 12 of the machine frame.

The mechanism for inverting consecutive workpieces 3 so that the treatment of surfaces 9 of a stack 4 of knives 6 can be followed by the treatment of surfaces 9' or vice versa comprises a turn-around device including two spaced-apart inverting members or heads 13, 13' each of which has means for engaging a workpiece 3 (actually the receptacle 7 if the latter contains a stack 4 of discrete workpieces) so that the surfaces 9 and 9' of the properly engaged workpiece 3 are accessible to the grinding wheel 11 (of course, the members 13, 13' must invert the receptacle 7 subsequent to completion of the treatment of surfaces 9 and prior to start of the treatment of surfaces 9' or vice versa). The inverting mechanism further comprises two pairs of arms or links 14, 14' and 16, 16' as well as pivot means for articulately connecting the arms or links 14, 14' to the inverting member 13 and support 2 and for articulately connecting the arms or links 16, 16' to the inverting member 13' and support 2. The pivot means for the arms 14, 14' comprises parallel shafts 17, 17' which secure the arms 14, 14' to two spaced-apart portions of the support 2, and shafts 31, 31' which are parallel to the shafts 17, 17' and secure the arms 14, 14' to two spaced-apart portions of the inverting member 13. The arms 16, 16' are connected to two spaced-apart portions of the support 2 by parallel shafts 18, 18' and to two spaced-apart portions of the inverting member 13' by shafts 131, 131' which are parallel to the shafts 17, 17', 31, 31', 18 and 18'.

The entraining means of each of the inverting members 13, 13' includes a socket 19 which is provided in the respective inverting member and an elongated straight profiled guide element 21 consisting of an elongated rail or bar 22 cooperating with one of complementary guide elements 23 on the clamping element 7b. The guide elements 23 surround and are movable along the guide elements 21 of the inverting members 13 and 13'. The guide elements 21, 23 cooperate to prevent undesirable changes in orientation of the receptacle 7 (i.e., of the workpiece 3) with reference to the inverting members 13, 13'.

The means for pivoting the arms 14, 14' and 16, 16' with reference to the support 2 and the respective inverting members 13, 13' comprises two fluid-operated (hydraulic or pneumatic) motors 24 and 24'. The piston rod 26 of the double-acting motor 24 is articulately connected to the inverting member 13 by a pivot member 27, and the piston rod 26' of the double-acting motor 24' is articulately connected to the cylinder of the motor 24 by a pivot member 29. The two cylinders are articulately connected to the support 2 by pivot members 28 and 28', respectively.

The mode of operation of the grinding machine and of the improved inverting mechanism is as follows:

The engaging means 19, 21 of the inverting members 13, 13' hold the receptacle 7 in the position of FIGS. 1 and 2 (first positions of the inverting members) in which the surfaces 9 of all knives 6 in the stack 4 which is confined in the receptacle 7 are accessible to the grinding wheel 11 and the surfaces 9' of all knives 6 are attracted to the face 2a of the magnetic support 2. The working surface of the rotating grinding wheel 11 provides each surface 9 with a cutting edge. The clamping element 7b of the receptacle 7 for the stack 4 extends beyond the clamping element 7a and into the sockets 19 of the inverting members 13 and 13'. The manner in which the end portions of the clamping element 7b can be temporarily locked in the respective inverting members 13, 13' is not specifically shown in the drawing.

Figure 3:
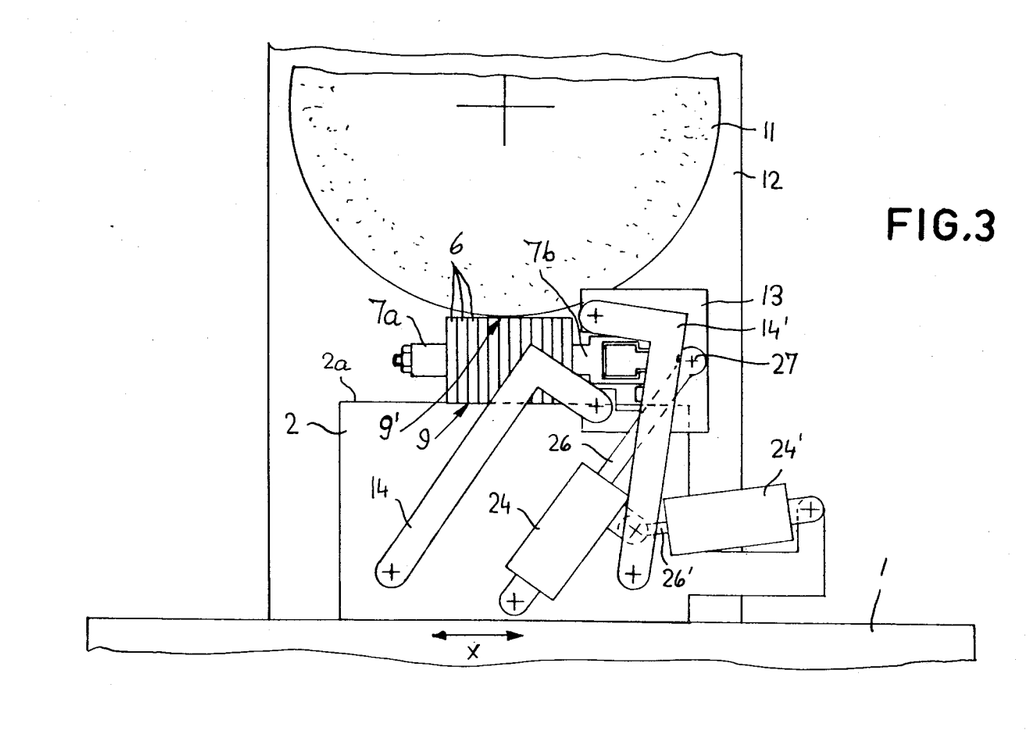
FIG. 3 shows the structure of FIG. 2 but with the inverting members in their second positions.

When the treatment of the surfaces 9 is completed, the table 1 is moved in one of the directions which are indicated by the arrow X, namely away from the column 12 for the grinding wheel 11. The motor 24 is then actuated to retract the piston rod 26 whereby the pivot member 27 moves downwardly and toward the motor 24. At the same time, the pivot member 31 moves downwardly along an arcuate path and the pivot member 31' moves upwardly along an arcuate path. The motor 24' is actuated while the motor 24 is in the process of pivoting the arms 14, 14' so that the piston rod 26' pulls the cylinder of the motor 24 in a direction to the right, as viewed in FIG. 2. The arms 14, 14' cause the inverting member 13 to move along a predetermined path outside of the top face 2a of the support 2 and to turn through 180 degrees about a predetermined axis which is parallel to the axes of the pivot members 17, 17'. Such turning of the inverting member 13 (with the inverting member 13' and receptacle 7) is completed when the inverting member 13 reaches the (second) position of FIG. 3. The surfaces 9 then abut the top face 2a and the surfaces 9' are accessible to the grinding wheel 11. The axis about which the workpiece 3 is turned through 180 degrees as a result of movement of the inverting member 13 from the position of FIG. 2 to the position of FIG. 3 is parallel to the plane of the top face 2a.

Figure 4:
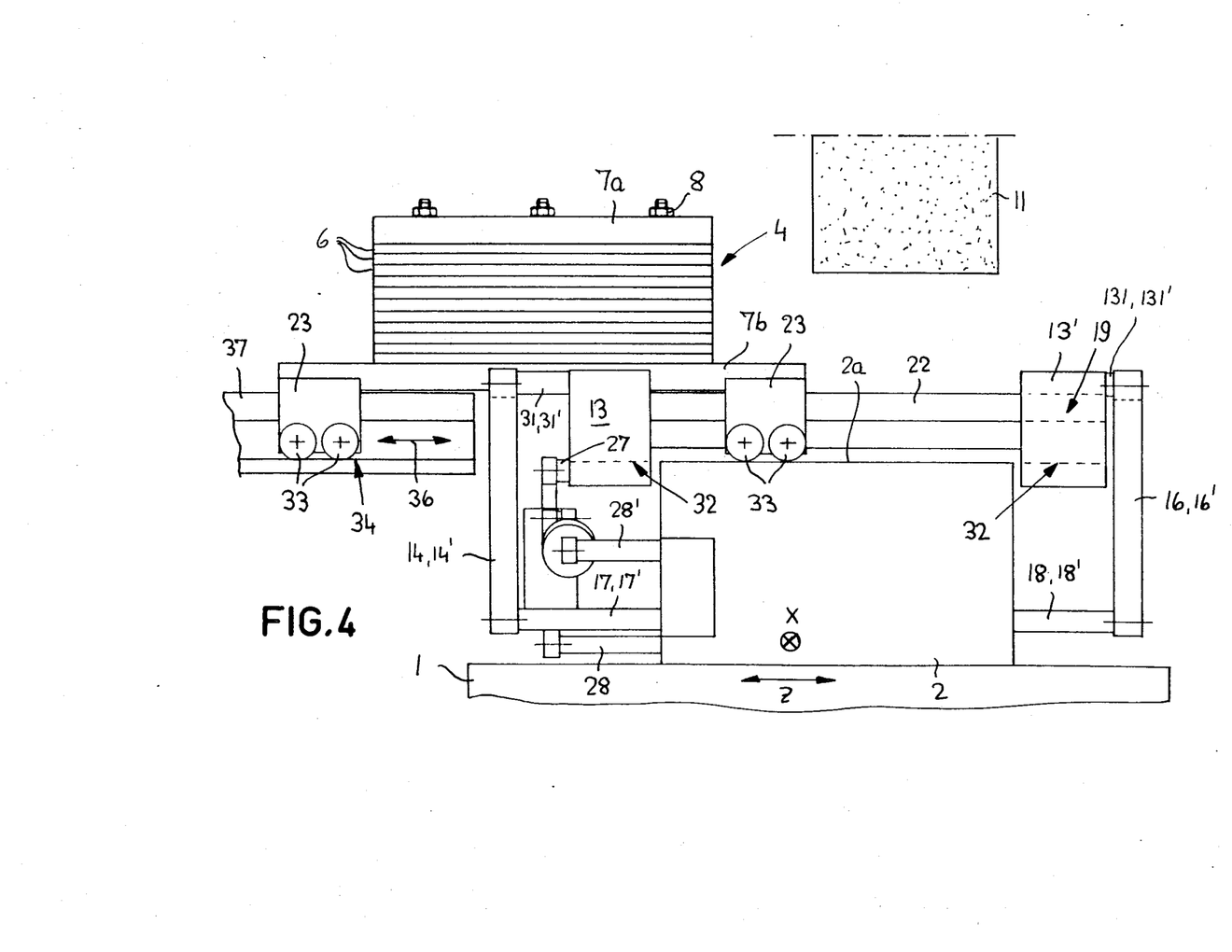
FIG. 4 is a fragmentary front elevational view of the grinding machine, showing the two inverting members in their third positions and the receptacle for the stack of knives on its way out of the turn-around device.
Figure 5:
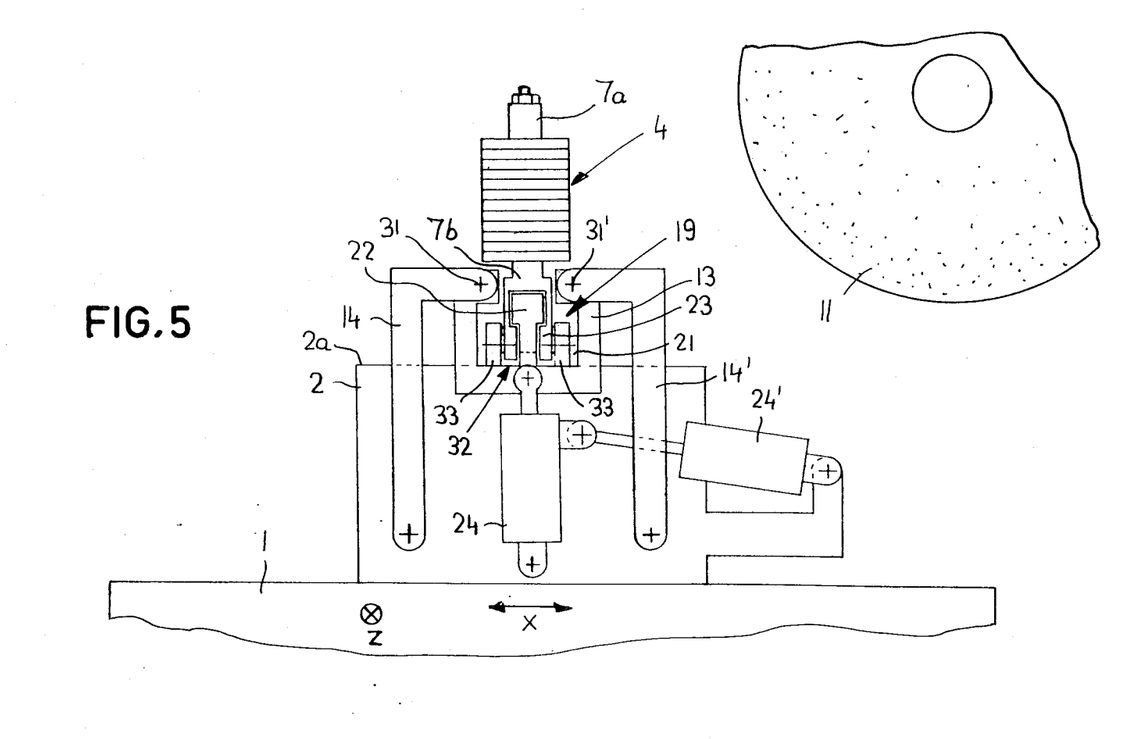
FIG. 5 is an end elevational view as seen from the left-hand side of FIG. 4.

When the grinding of the surfaces 9' is completed, the motors 24, 24' are actuated to move the inverting member 13 to the (third) position of FIGS. 4 and 5. Such third position is disposed midway between the positions of FIGS. 2 and 3 and is the position in which the finished workpiece 3 and its receptacle 7 can be detached from the inverting members 13 and 13'. The inverting member 13 is moved to the third position of FIGS. 4 and 5 in response to actuation of the motors 24, 24' in the reverse order, i.e., first the motors 24, 24' jointly and thereupon the motor 24 alone so that the inverting member 13 is caused to move back toward the first position of FIGS. 1 and 2. The motors 24, 24' are arrested when the inverting member 13 reaches the third position of FIGS. 4 and 5; at such time, an exposed side or surface 32 of the guide element 21 of each of the inverting members 13, 13' is flush with the top face 2a of the support 2. The inverting members 13 and 13' then face upwardly and the guide elements 23 at the ends of the clamping element 7b lie on the sides 32 of the adjacent guide elements 21. The left-hand end of the socket 19 of the inverting member 13, as viewed in FIG. 4, is open so that the receptacle 7 can be removed, by moving the clamping element 7b longitudinally, with a minimum of effort. The removing operation involves a movement of the guide elements 23 along the top face 2a of the support 2. Such removing operation can be facilitated still further by providing the guide elements 23 with roller followers 33 which travel along the top face 2a and exposed side 32 of 13 during detachment of the receptacle 7 from the inverting members 13 and 13'. The roller followers 33 can be said to constitute component parts of the guide elements 23, i.e., of the clamping element 7b.

FIG. 4 shows that the guide elements 23 are provided at the ends of the clamping element 7b, i.e., that the roller followers 33 are disposed at the ends of the workpiece 3. The profiles of the guide elements 23 conform to those of the guide elements 21. In fact, the rail 22 of the guide element 21 of the inverting member 13 constitutes a coupling which connects the inverting members 13, 13' to each other so that all movements of the inverting member 13' are synchronized with those of the inverting member 13, i.e., the motors 24 and 24' drive the inverting member 13' through the medium of the inverting member 13.

FIG. 4 further shows a work feeding unit 37 which is reciprocable in directions indicated by the double-headed arrow 36 and has a surface 34 flush with the top face 2a of the support 2 and with the exposed sides 32 of the inverting members 13 and be 13'. The receptacle 7 for the workpiece 3 can rolled along the composite surface 34, 2a, 32 toward and away from engagement with the inverting members 13, 13' in parallelism with the predetermined axis about which the inverting members 13, 13' turn during travel between the positions of FIG. 2 and the positions of FIG. 3. The removal of a receptacle 7 with a finished workpiece 3 therein and the introduction of a receptacle with a fresh (untreated) workpiece 3 is simple, effortless and takes up a short interval of time. The exchange of workpieces and their receptacles does not necessitate the provision of any additional parts (with the exception of the feeding unit 37) and the inverting elements 13, 13' can be moved to their third positions (FIGS. 4 and 5) by the drive means which serves to move the inverting members to their first and second positions which are respectively shown in FIGS. 2 and 3. The exchange of workpieces takes up little time on the additional ground that the third position is between the first and second positions of the inverting members 13 and 13'. Once the inverting members 13 and 13' assume the third positions of FIGS. 4 and 5, the receptacle 7 with a finished workpiece 3 therein is simply moved lengthwise through the socket 19 of the inverting member 13. The introduction of a receptacle 7 with a fresh (untreated) workpiece 3 therein into the grinding machine is completed when the two guide elements 23 of the clamping element 7b enter the sockets 19 of the respective inverting members 13, 13'.

In lieu of or in addition to the coupling means 22, the movements of the inverting member 13' can be synchronized with those of the inverting member 13 in a number of other ways. For example, the pivot members 17, 18 and 17', 18' can constitute exposed end portions of two parallel shafts which are rotatably journalled in the support 2 and respectively carry and share all angular movements of the arms 14, 16 and 14', 16', respectively. Synchronization of all movements of the inverting member 13' with those of the inverting member 13 is desirable and advantageous because this prevents twisting, jamming, tilting and/or other stray movements of the workpieces 3 and their receptacles 7.

When the insertion of a receptacle 7 with a fresh workpiece 3 therein into the inverting members 13 and 13' is completed, the motors 24 and 24' are actuated again to move the inverting members 13, 13' to the positions of FIG. 2 or FIG. 3 so that the grinding wheel 11 can proceed with the removal of material from the surfaces 9 or 9' of the fresh workpiece.

The inverting mechanism can be simplified by equipping it with a single inverting member 13 or 13' whose engaging means holds a workpiece or a receptacle for a stack of workpieces in cantilever fashion. The provision of two inverting members is desirable and advantageous when the workpieces (with or without a receptacle) are rather bulky and heavy.

As can be ascertained by looking at FIGS. 2 and 3, the workpiece 3 occupies the same portion of the top face 2a prior and subsequent to inversion of the workpiece by the inverting members 13 and 13'. This constitutes an important advantage of the improved machine tool because the position of the support 2 with reference to the grinding wheel 11 need not be changed for the purpose of ensuring that the workpiece 3 between the inverting members 13, 13' is properly positioned relative to the grinding wheel prior as well as subsequent to the inverting step. Moreover, the distance which the grinding wheel 11 must cover on its way into material-removing engagement with the surfaces 9 or 9' can be kept to a minimum with attendant increase in the output of the machine.

The configuration of the engaging means for the workpiece or the receptacle is such that the workpiece or the receptacle is confined to movements in parallelism with the axis of the grinding wheel 11 and with the axis about which the inverting members 13 and 13' turn in the course of the work inverting operation. This reduces the likelihood of accidental disengagement of the workpiece or its receptacle from the inverting member or members.

The aforedescribed positioning of the surface 34, sides 32 and top face 2a relative to each other when the inverting members 13 and 13' assume the (third) positions of FIGS. 4 and 5 is that the workpiece need not move from a higher level to a lower level or vice versa during introduction into or during withdrawal from the sockets 19 of the inverting members 13 and 13'. Such positioning of the surface 34, sides 32 and end face 2a is especially desirable when the workpieces are relatively heavy, i.e., when the machine must employ two inverting members. The provision of roller followers 33 is particularly desirable and advantageous when the receptacle 7 contains a rather heavy and bulky workpiece.

All embodiments of the invention share the advantage that consecutive workpieces or their receptacles can be reliably held during treatment as well as during inversion and also that the inversion does not involve any manual work. The actuation of the motors 24, 24' can be started and terminated by the automatic control means of the machine tool in response to signals from suitable sensors which monitor the grinding of the surfaces 9, 9', the positions of the inverting members 13, 13' and/or other parameters. The absence of the need for manual inversion of workpieces contributes significantly to the reliability and accuracy of treatment as well as to higher output of the machine. The advantages of ensuring that the workpiece occupies the same portion of the top face 2a prior and subsequent to inversion have been pointed out above, i.e., the support 2 can be located close to the grinding wheel 11 to thus ensure that little time is wasted for movement of the grinding wheel into engagement with the surfaces 9 or 9' or vice versa. An additional advantage of the improved inverting mechanism is that it can be installed in existing grinding machines or other types of machine tools at a reasonable cost. At the present time, the improved mechanism is intended for use primarily in all types of grinding, lapping and like machines including surface grinding and profile grinding machines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine for removing material from consecutive workpieces of the type having pairs of surfaces to be treated and wherein such surfaces are disposed opposite each other, especially for grinding consecutive stacks of twin-bladed knives for use in hedge trimming apparatus and the like, comprising a rotary material removing tool; a support having a work supporting face; and a mechanism for inverting consecutive workpieces with reference to said support so that the treatment of one surface of the workpiece resting on said support can be followed by the treatment of the other surface of such workpiece, comprising a turn-around device including at least one inverting member having means for engaging consecutive workpieces outside of said surfaces of the engaged workpiece and to hold the engaged workpiece in cantilever fashion, and drive means for moving said inverting member and the workpiece which is held by the inverting member between a first position in which one surface of the engaged workpiece is in a position to be treated by said tool and a second position in which the other surface of the engaged workpiece is in a position to be treated by said tool, said drive means defining for the movement of said inverting member a path wherein said inverting member is remote from said work supporting face and is caused to turn about a predetermined axis which is at least substantially parallel to said face, said drive means comprising a pair of arms, first pivot means articulately connecting said arms to said inverting member for angular movement about discrete first and second axes, second pivot means articulately connecting said arms to said support for angular movement about discrete third and fourth axes which are parallel to said first and second axes, and means for pivoting said arms about the respective axes.

2. The machine of claim 1, wherein said drive means includes link means defining said path, said inverting member being arranged to turn the engaged workpiece through an angle of 180° during movement between said first and second positions.

3. The machine of claim 1, wherein said predetermined axis is parallel to said first axis and the workpiece which is held by said engaging means rests on the face of said support in the first as well in the second position of said inverting member.

4. The machine of claim 1, wherein said other and said one surface of the engaged workpiece respectively contact said face of said support in the first and second positions of said inverting member, said inverting member having an exposed side and being movable along said path to a third position in which said exposed side is closely adjacent said face, the workpiece which is held by said engaging means being separable therefrom in the third position of said inverting member.

5. The machine of claim 4 wherein said inverting member assumes said third position on its way from said first to said second position or vice versa.

6. The machine of claim 1, wherein the workpiece which is held by said engaging means occupies one and the same portion of said support in each of said positions of said inverting member.

7. The machine of claim 1, wherein said drive means comprises at least one fluid-operated motor.

8. A machine for removing material from consecutive workpieces of the type having pairs of surfaces to be treated and wherein such surfaces are disposed opposite each other, especially for grinding consecutive stacks of twin-bladed knives for use in hedge trimming apparatus and the like, comprising a rotary material removing tool; a support having a work supporting face; a mechanism for inverting consecutive workpieces with reference to said support so that the treatment of one surface of the workpiece resting on said support can be followed by the treatment of the other surface of such workpiece, comprising a turn-around device including at least one inverting member having means for engaging consecutive workpieces outside of said surfaces of the engaged workpiece, said engaging means having a socket provided in said inverting member and a first guide element in said socket, and drive means for moving the inverting member and the workpiece which is held by the inverting member between a first position in which one surface of the engaged workpiece is in a position to be treated by said tool and a second position in which the other surface of the engaged workpiece is in a position to be treated by said tool, said drive means defining for the movement of said inverting member a path wherein said inverting member is remote from said work supporting face and is caused to turn about a predetermined axis which is at least substantially parallel to said face; and a receptacle for workpieces, said receptacle having a second guide element complementary to said first guide element and reciprocable along said first guide element into and out of said socket.

9. The machine of claim 8, wherein said second guide element is reciprocable in directions parallel to said predetermined axis.

10. A machine for removing material from consecutive workpieces of the type having pairs of surfaces to be treated and wherein such surfaces are disposed opposite each other, especially for grinding consecute stacks of twin-bladed knives for use in hedge trimming apparatus and the like, comprising a rotary material removing tool; a support having a work supporting face; and a mechanism for inverting consecutive workpieces with reference to said support so that the treatment of one surface of the workpiece resting on said support can be followed by the treatment of the other surface of such workpiece, comprising a turn-around device including two spaced-apart inverting members each having means for engaging consecutive workpieces outside of said surfaces of the engaged workpiece, said engaging means being arranged to hold two spaced-apart portions of a workpiece so that said surfaces of the engaged workpiece are accessible to said tool, and drive means for moving said inverting members in synchronism so that the workpiece which is held by the inverting members is moved between a first position in which one surface of the engaged workpiece is in a position to be treated by said tool and a second position in which the other surface of the engaged workpiece is in a position to be treated by said tool, said drive means defining for the movement of said inverting members a path wherein said inverting members are remote from said work supporting face and are caused to turn about a predetermined axis which is at least substantially parallel to said face.

11. The machine of claim 10, further comprising means for coupling said inverting members to each other.

12. The machine of claim 11, wherein said coupling means includes the entraining means of one of said inverting members.

13. The machine of claim 10, wherein said drive means comprises a pair of arms for each of said inverting members, first pivot means for coupling said arms to the respective inverting members and second pivot means for coupling said arms to said support, each of said second pivot means including a shaft rotatably journalled in said support and the arms for said one inverting nember as well as the arms for the other of said inverting members being non-rotatably mounted on the respective shafts.

14. A machine for removing material from consecutive workpieces of the type having pairs of surfaces to be treated and wherein such surfaces are disposed opposite each other, especially for grinding consecutive stacks of twin-bladed knives for use in hedge trimming apparatus and the like, comprising a rotary material removing tool; a support having a work supporting face; and mechanism for inverting consecutive workpieces with reference to said support so that the treatment of one surface of the workpiece resting on said support can be followed by the treatment of the other surface of such workpiece, comprising a turn-around device including at least one inverting member having means for engaging consecutive workpieces outside of aid surfaces of the engaged workpiece, and drive means for moving the inverting member and the workpiece which is held by the inverting member between a first position in which one surface of the engaged workpiece is in a position to be treated by said tool and a second position in which the other surface of the engaged workpiece is in a position to be treated by said tool, said drive means defining for the movement of said inverting member a path wherein said inverting member is remote from said work supporting face and is caused to turn about a predetermined axis which is at least substantially parallel to said face; and a receptacle for workpieces, said receptacle having rotary follower means and said engaging means including a socket provided in said inverting member and a rail arranged to guide said follower means for introduction of a portion of said receptacle into said socket.

15. The machine of claim 14, wherein said inverting member is further movable along said path to a third position in which a side of said rail is at least substantially flush with said face of said support.

16. A machine for removing material from consecutive workpieces of the type having pairs of surfaces to be treated and wherein such surfaces are disposed opposite each other, especially for grinding consecutive stacks of twin-bladed knives for use in hedge trimming apparatus and the like, comprising a rotary material removing tool; a support having a work supporting face; and a mechanism for inverting consecutive workpieces with reference to said support, comprising a turn-around device including at least one inverting member having means for engaging consecutive workpieces outside of said surfaces of the engaged workpiece, and drive means for moving the inverting member and the workpiece which is held by the inverting member between a first position in which one surface of the engaged workpiece rests on said supporting face and a second position in which the other surface of the engaged workpiece rests on said supporting face, said drive means comprising at least one pair of arms pivotally fixed to said inverting member and to said support, respectively, and means for moving said arms along a predetermined path so as to lift the workpiece which is engaged by said inverting member off said supporting face, to turn the lifted workpiece about an axis which is at least substantially parallel to said supporting face, and to deposit the thus inverted workpiece on said supporting face.

* * * * *